(12) United States Patent
Ghouse

(10) Patent No.: US 6,327,742 B1
(45) Date of Patent: Dec. 11, 2001

(54) FREE FLOATING CASTOR

(76) Inventor: Syed M Ghouse, Baitus-Salam, 11-4-636, A.C. Guards, Hyderabad-500 004 (IN)

( * ) Notice: Subject to any disclaimer, the term of this patent is extended or adjusted under 35 U.S.C. 154(b) by 0 days.

(21) Appl. No.: 09/426,526

(22) Filed: Oct. 26, 1999

Related U.S. Application Data

(63) Continuation-in-part of application No. 09/055,719, filed on Apr. 6, 1998, now Pat. No. 5,996,176.

(30) Foreign Application Priority Data

Dec. 12, 1997 (IN) ............................................. 2860/MAS97

(51) Int. Cl.[7] .................................................... B60B 33/00
(52) U.S. Cl. ................................ 16/29; 16/18 R; 16/35 D
(58) Field of Search ........................... 16/18 R, 29, 31 A, 16/31 R, 40, 39, 35 D

(56) References Cited

U.S. PATENT DOCUMENTS

| 1,839,396 |   | 1/1932  | Kimball   | 16/18 R |
|-----------|---|---------|-----------|---------|
| 2,073,066 |   | 3/1937  | Kalberer  | 16/36   |
| 2,170,257 |   | 8/1939  | Andersen  | 16/31 R |
| 3,047,904 | * | 8/1962  | MacDonald | 16/29   |
| 3,246,908 | * | 4/1966  | Marvin    | 16/18 R |
| 3,758,917 |   | 9/1973  | Schroer   | 16/36   |
| 4,471,508 | * | 9/1984  | Seaborg   | 16/18 R |
| 5,078,221 | * | 1/1992  | Rewitzer  | 16/31 R |
| 5,996,176 | * | 12/1999 | Ghouse    | 16/29   |

FOREIGN PATENT DOCUMENTS

| 1805607   | * | 9/1970  | (DE) | 16/18 R |
|-----------|---|---------|------|---------|
| 00-75802  | * | 4/1984  | (JP) | 16/18 R |
| 406040202 | * | 2/1994  | (JP) | 16/18 R |
| 409276337 | * | 10/1997 | (JP) | 16/18 R |

* cited by examiner

Primary Examiner—James R. Brittain
Assistant Examiner—Ruth C. Rodriguez
(74) Attorney, Agent, or Firm—MacMillan, Sobanski & Todd, LLC

(57) ABSTRACT

A free floating castor includes a wheel assembly mounted to move relative to a vertical axis of rotation at which it is attached to a trolley to provide space for the wheel to move freely within a fixed area. At least one shaft extends perpendicular to the vertical axis of rotation and the axis of rotation of the wheel on its axle. A bearing permits movement of the axle along the shaft in between two limits. In a second embodiment, a rotary joint assembly is connected between the vertical axis of rotation and the wheel to permit the wheel to revolve through 360° around a vertical axis of the rotary joint assembly.

12 Claims, 13 Drawing Sheets

DEFINITION OF FORCES ACTING ON STANDARD CASTER IN A STABLE CONDITION OF MOTION.

DEFINITION OF FORCES ACTING ON STANDARD CASTER IN A STABLE CONDITION OF MOTION.

DISPLACEMENT OF FREE FLOATING CASTOR, ALONG LONGITUDINAL AXIS, DURING REVERSAL

FREEDOM OF MOVEMENT ALONG FORE AND AFT AXIS

DISPLACEMENT OF FREE FLOATING CASTOR, ALONG LONGITUDINAL AXIS, DURING REVERSAL

DISPLACEMENT OF FREE FLOATING CASTOR,
ALONG LONGITUDINAL AXIS, DURING REVERSAL

FREE FLOATING CASTOR

CROSS-REFERENCE TO RELATED APPLICATIONS

This application is a continuation-in-part of U.S. patent application Ser. No. 09/055,719, filed Apr. 6, 1998, now U.S. Pat. No. 5,996,176.

BACKGROUND OF THE INVENTION

The present invention relates generally to castors and more particularly to free floating castors.

The state of the art castors, as we are all aware, are wheels that trail the direction of motion of the platform or trolley onto which they are mounted. The wheel in the castor assembly has freedom to revolve, in the horizontal plane, around the vertical axis of the castor assembly, through 360°. The wheel being located at a certain distance (trail distance) from the single vertical axis of the assembly at the end of a trail arm makes the wheel follow the direction of the motion of the trolley.

Standard castors have two inherent flaws—one, the castors have a tendency to get wedged, and two, swiveling/fishtailing of the trolley onto which the castors are fitted when the direction of motion is reversed.

Wedging is a momentary restriction in the smooth motion of a castor trolley experienced during reversal of direction of its travel. While reversing the direction of motion, the castor becomes dynamically unstable. The wheel initially follows the reverse path and then deviates. During this process, the castors have to revolve to realign. The castors could either revolve in the same or opposite directions. Wedging occurs when both castors revolve either inwards or outwards, i.e., in opposite directions. During the reversal motion, the wheels get dragged momentarily until they realign. In order to overcome wedging, extra efforts needs to be applied which will be proportional to the weight on the wheels. This difficulty would, in day-to-day life, have been experienced while handling baggage trolleys at airports, etc.

Fishtailing of the trolley also occurs while reversing. Owing to the revolving action, the castors could revolve in the direction opposite to the intended one. For instance, while reversing the direction from forward to rearward, the castors could revolve in clockwise direction. Thereby, the trolley will swing towards the right hand side. In case of an obstruction ahead and in order to avoid it, one needs to apply additional force to turn left. However, on doing so, one finds a momentary resistance to the effort because the castors are revolving in the wrong direction. By continuing to pull backwards, one could hit the obstacle. The way out would be to push forward again, make the castors revolve in the opposite direction and then pull back or apply enough force to drag the wheels in the desired direction.

SUMMARY OF THE INVENTION

The present invention concerns an apparatus for improving the operation of castors by providing space for the wheel to move freely. The wheel thus can float freely within a fixed area. The principle of implementing the free floating castors can be done in two ways. One is by providing at least one shaft perpendicular to both the castor vertical axis and the wheel axle axis and thus making the wheel axle free to along the shaft between two stoppers/limits. The second principle is that of double rotary joints wherein an additional vertical rotary axis/joint is provided equidistant between the vertical axis and the center of the wheel. The additional rotary axis/joint enables the trail arm to revolve through 360° in the horizontal plane around it. In comparison to this, the standard castors have only one vertical axis.

The entire assembly can be fabricated according to any desired specification. There is no limit either to its size or weight carrying capacity. In terms of costs, the only added cost being that of shaft or rotary joint to a certain extent additional machining and fabrication charges.

Free floating castors find its usage and can be installed on all trolleys, equipment bodies, automated guided vehicles, etc. on which the standard castors are installed and on platforms/bodies on which the phenomenon of "wedging"/"fish-tailing" hitherto precluded installation/usage of castors. The free floating castor, according to the present invention, is easier in operation, allows free and better maneuverability thereby increasing its efficiency—enabling installation of the device on a wider range of platforms—and is cost effective, when compared with the state of the art castors.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2b is a schematic plan view of the standard wheel shown in the FIG. 2a;

DESCRIPTION OF THE PREFERRED EMBODIMENT

Figure 1:
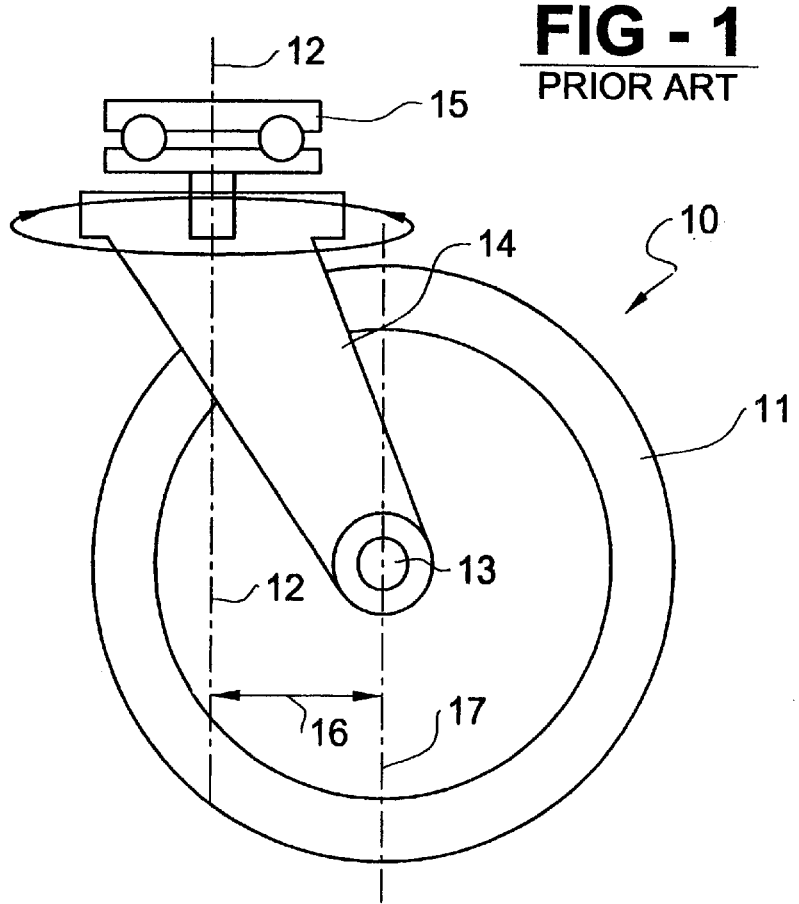
FIG. 1 is a schematic elevation view of a prior art castor.

Castors are wheels that trail the direction of motion of the platform onto which they are mounted. Castors are installed on various types of trolleys, furniture, etc. A generic design of a typical prior art castor assembly 10 is shown in the FIG. 1. For ease of understanding, a platform equipped with castor is referred hereinafter as a "trolley". However, the following description applies to any object equipped with castors.

A wheel 11 of the castor assembly 10 has freedom to revolve, in a horizontal plane, around a vertical axis 12 of the castor assembly, through 360°. The wheel 11 is rotatably mounted on an axle 13 attached to a lower end of a trail arm or bracket 14 having an upper end attached to a bearing for rotation about the vertical axis 12. The arm or bracket 14 extends downwardly at an angle from the bearing 15 so that the axle 13 is located at certain distance 16 from the castor vertical axis 12 of rotation of the assembly 10. This mounting orientation makes the wheel 11 follow/trail the direction of motion of the trolley to which the assembly 10 is attached. To steer a trolley, differential forces are applied.

The standard type castors suffer from, basically, two inherent flaws, any one of which could be experienced whenever the direction of motion of the trolley is reversed. These flaws are, as follows: 1) castors getting wedged; and 2) swiveling/fishtailing of the castors/trolley in the direction opposite to the intended direction of motion. These flaws or defects have been obviated in the free floating castors according to the present invention. However, before discussing the design features of the free floating castors that make this possible, the reasons due to which the above-identified problems occur in respect of the standard castors are discussed below.

Figure 2A:
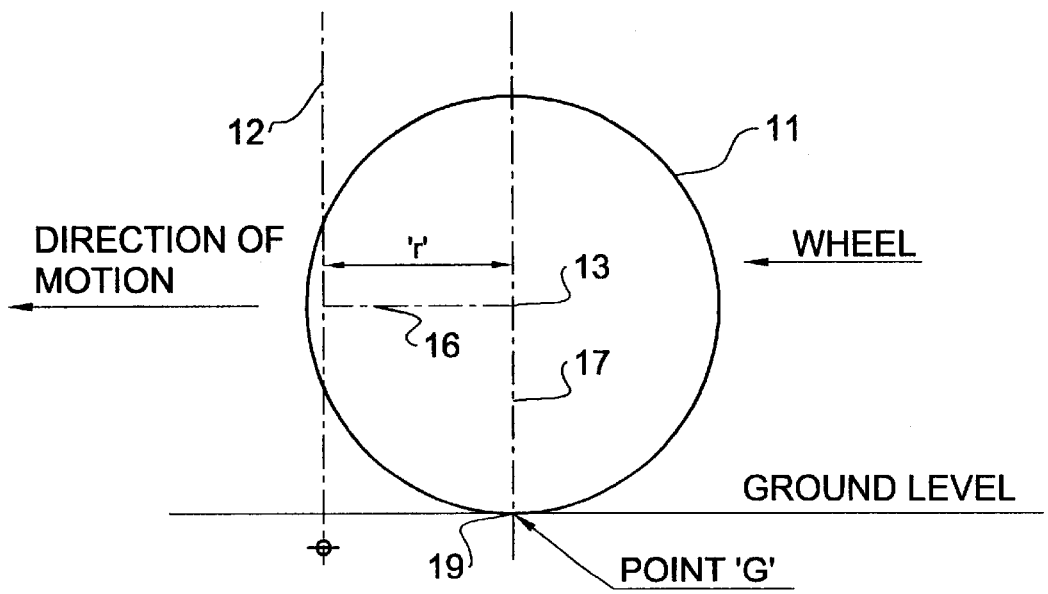
FIG. 2a is schematic elevation view of the standard wheel shown in the FIG. 1.
Figure 2B:
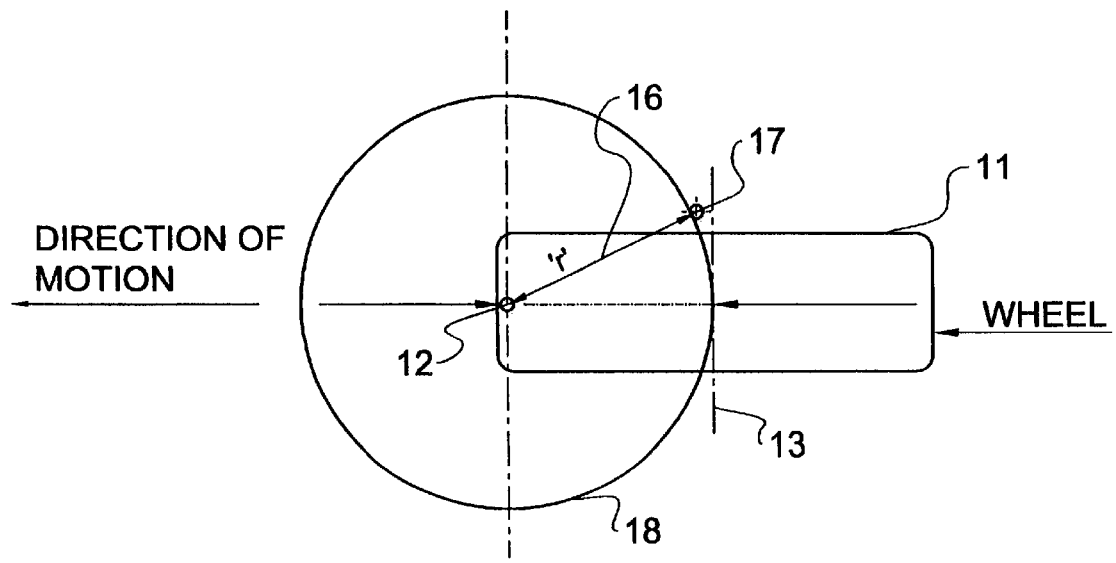

Wedging is the momentary restriction in the smooth motion of a castor equipped trolley, experienced during reversal of direction of its travel. As shown in the FIG. 2a, the castor vertical/revolving axis 12 of the standard castor assembly 10 and a generally parallel vertical axis 17 of the wheel 11 at the axis of rotation 13 are separated by the distance 16 between them. The wheel vertical axis 17 has freedom to revolve in a circle 18, with the castor vertical axis 12 as the center and the distance 16 its radius (see the FIG. 2b). Due to this arrangement, the wheel 11 will trail, at the distance 16 from the axis 12. The wheel 11 will remain in a stable condition during motion.

When reversing the direction of motion, however, the castor assembly 10 becomes dynamically unstable. The wheel 11 initially follows the reverse path for an instant and then deviates. As it moves further away from the direction of travel, a point of contact 19 of the wheel with the ground (see the FIG. 2a) acts as a pivot, around which the castor vertical axis 12 revolves, until the castor assembly gets realigned.

Now, let us consider two castors mounted across a lateral "X" axis 20 (see the FIG. 3a), such as a pair of wheels mounted at the rear corners of a trolley, and moving along a perpendicular "Y" axis 21, such as the longitudinal axis of the trolley. The castors include a pair of wheels 22 and 23 spaced apart by a distance 24. Now, if the direction of motion is reversed, the castors are leading the castor vertical axis 12 and will have to revolve to re-align. During the process, the castors could either revolve in the same or opposite directions.

Had there been only one castor, or with both castors revolving in the same direction, the castor vertical axis 12 would have been able to describe an arc of radius 16 around the point of contact 19, with the trolley moving along the 'Y' axis 21.

Wedging occurs when both castors revolve either inwards or outwards (see the FIG. 3b) wherein, the above described freedom of motion/space will not be available when the two castors revolve in opposite directions. As the trolley moves forward, the wheels 22 and 23 tend to move inwards or outwards, toward the castor vertical axis 12. But, since the distance 16 is fixed, the wheel 11 will get wedged between the castor vertical axis 12 and the point of contact 19. As such, it will only be possible for the wheels 11 to move against friction (slide) which will be a function of the weight on the respective wheel and coefficient of friction.

Therefore, the wheels 11 get dragged till they realign. In order to overcome wedging, extra effort will have to be applied to the trolley, which effort will be proportional to the weight on the wheels. This difficulty has been experienced by, almost, all of us, especially while handling baggage trolleys at airports, etc.

Figure 3A:
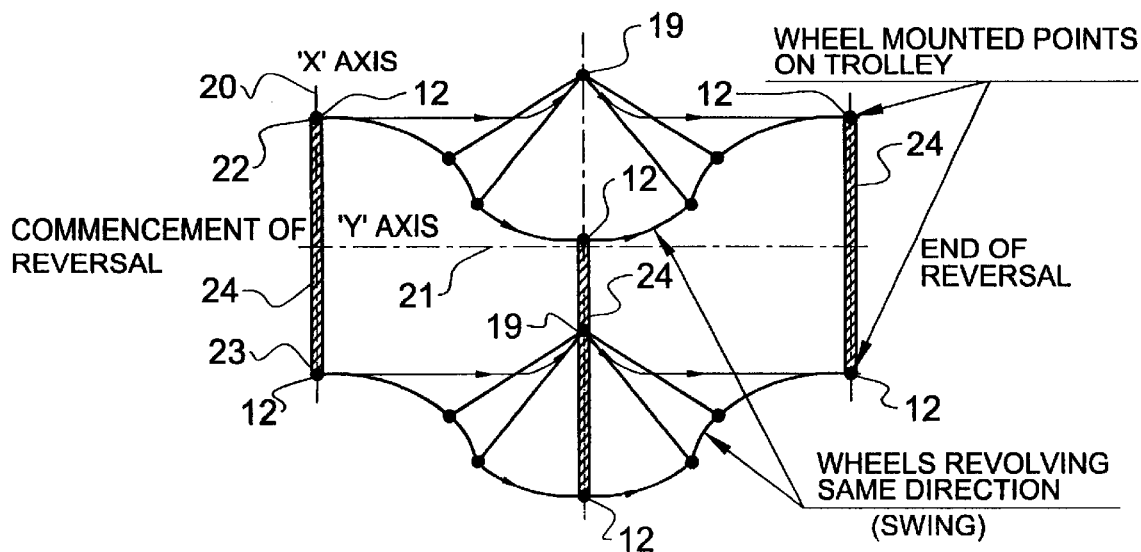
FIGS. 3a and 3b are schematic plan views of the path of travel of the standard wheel shown in the FIG. 1.
Figure 3B:
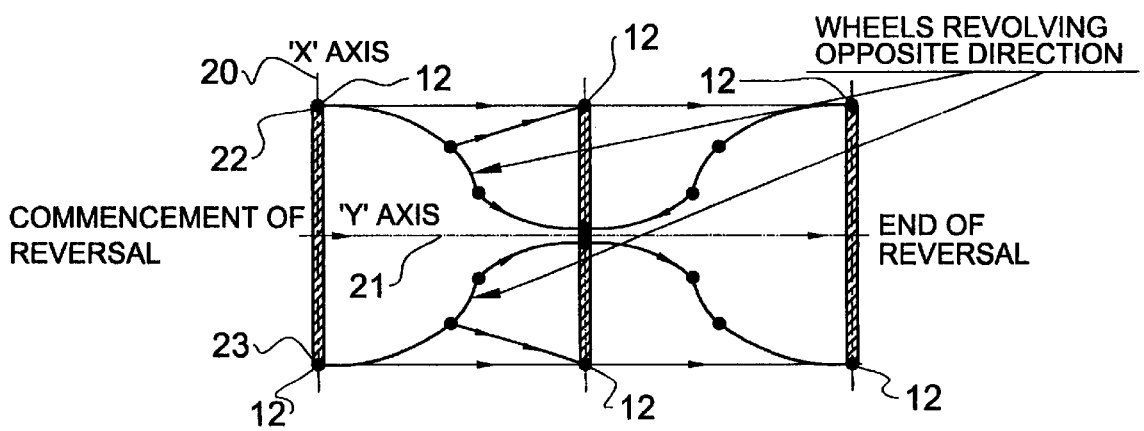
Figure 4A:
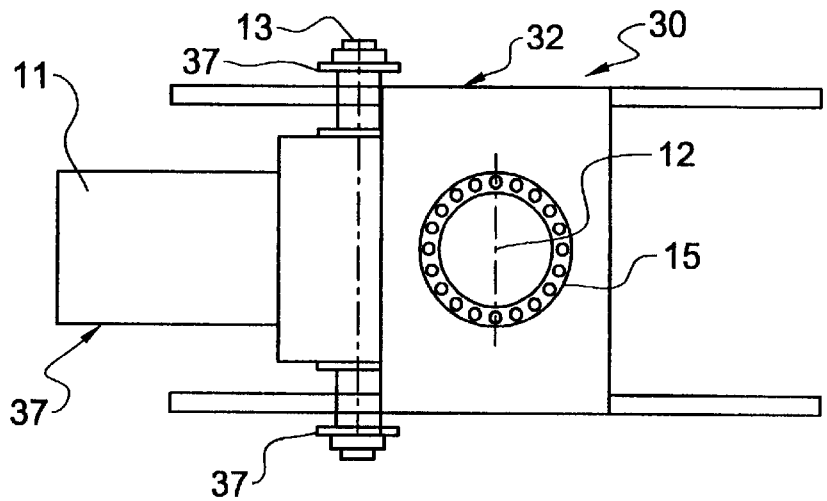
FIGS. 4a, 4c and 4e are plan views of the free floating castor in accordance with a first embodiment of the present invention.
Figure 4B:
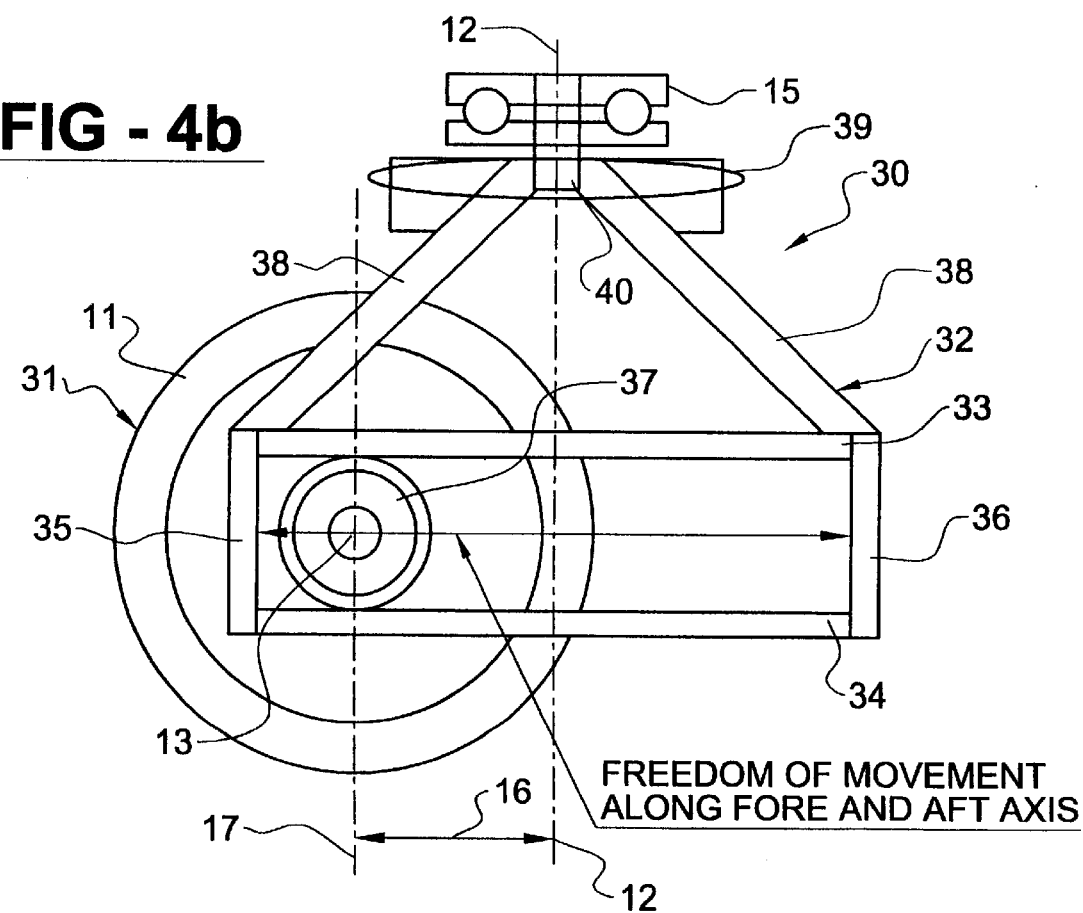
FIGS. 4d and 4d and 4f elevation views of the free floating castor in accordance with the present invention corresponding to the FIGS. 4a, 4c and 4e respectively.
Figure 4C:
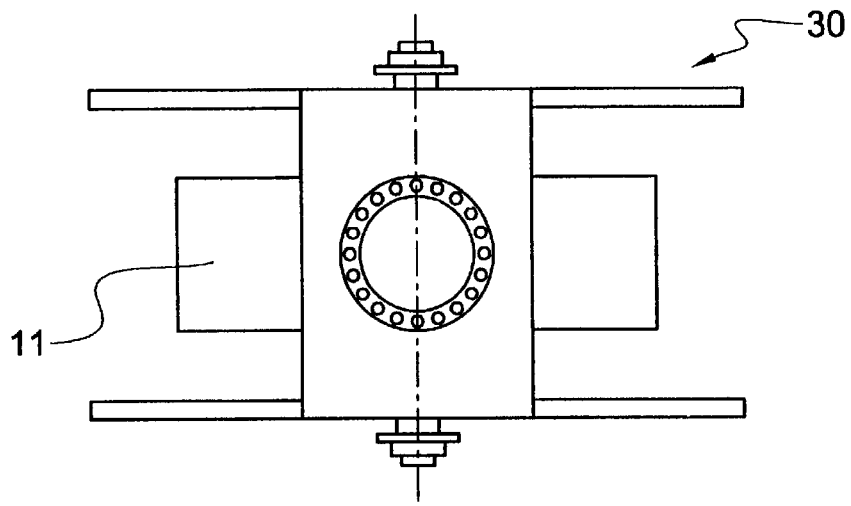
Figure 4D:
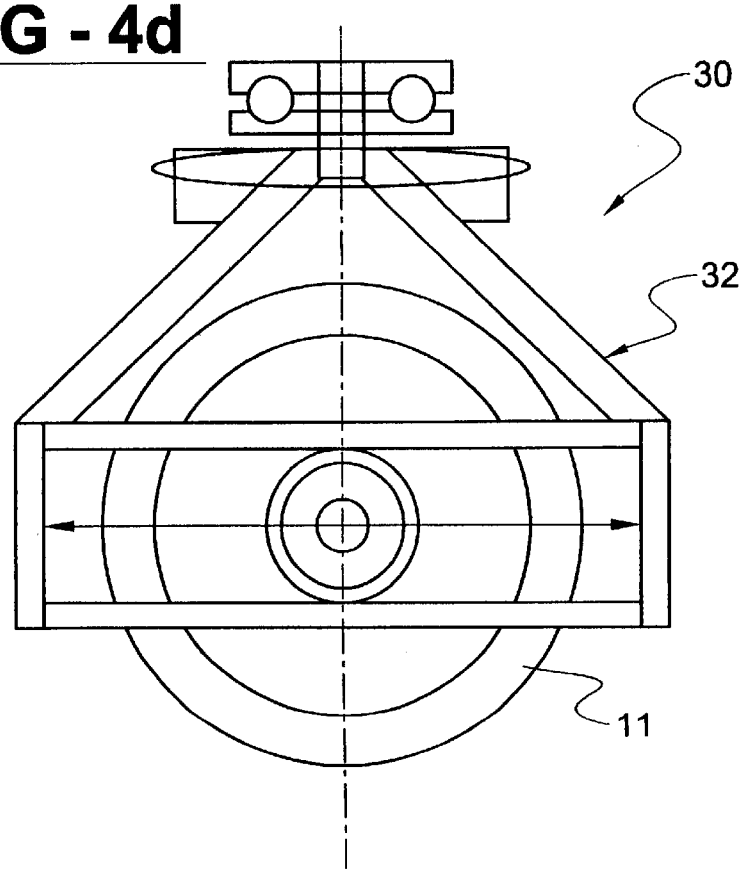
Figure 4E:
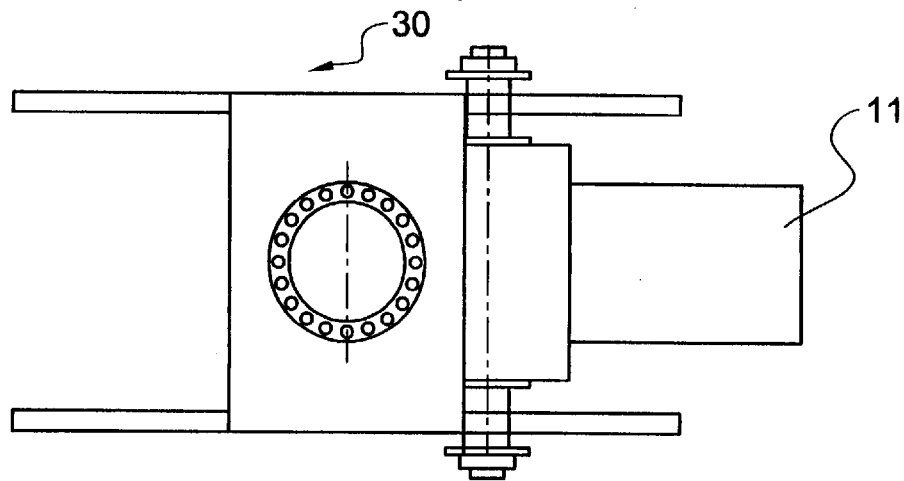
Figure 4F:
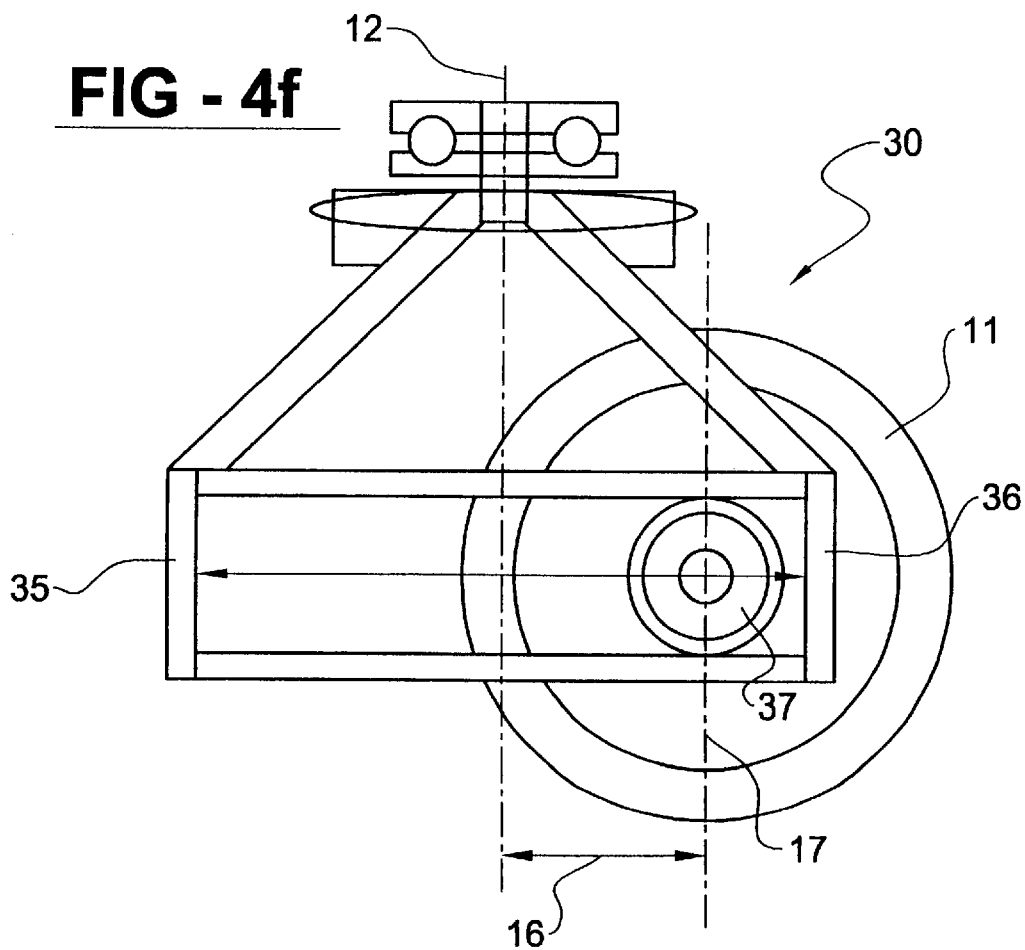

While reversing, due to the revolving action, the trolley swings or fishtails (see the FIG. 3a). This would pose no severe problem if enough space is available, to accommodate the revolving or fishtailing. Therefore, let us examine the alternative case.

Let us assume that, while reversing the direction from forward to rearward, the castors revolve in the clockwise direction. The trolley will swing towards the right hand side as shown in the FIG. 3a. Now imagine that there is an obstruction there. In order to avoid it, you might apply force to turn left. However, you will find a resistance to the effort, because the castors are revolving in the wrong direction at this instant. By continuing to pull backwards, you will hit the obstacle. The way out would be to push forward again, make the castors revolve in the opposite direction, and then pull back or apply enough force to drag the wheels in the desired direction.

The problem gets compounded when a trolley has four castors, instead of two. Further, even if there be no obstacle, fishtailing is disconcerting. The trolley does not respond in the desired manner.

From the foregoing, it can be appreciated that the standard castors suffer from certain inherent drawbacks. Although they work quite satisfactorily under stable conditions of motion, this is not the case while reversing or maneuvering in restricted space.

The aforesaid problems have been overcome by incorporating certain unique and innovative design features in the free floating castors according to the present invention as shown in the FIGS. 4a through 4f. The inability of the wheel vertical axis 17 to traverse through the castor vertical axis 12 is the problem to be solved by the castor according to the present invention. As stated above, the radius 16 of the castor assembly is fixed. Due to this, the standard castors suffer from the defects, as discussed. Therefore, if a facility is provided for the wheel 11 to move freely along the distance 16, through the castor vertical axis 12, the problem can be overcome.

In the free floating castors according to the present invention, not only is this movement possible, but the wheel vertical axis 17 can assume any position within the radius 16. Due to this, the wheel 11 can float freely within this area. Thus, the name "Free Floating Castor" has been coined.

The basic design principle of the free floating castor is making the distance 16 variable, within certain limits. This will enable the wheel vertical axis 17 to move across the longitudinal axis of the wheel 11, from one extreme to the other, while reversing the direction of motion. When in motion, the wheel 11 will assume its trail position and be stable (see the FIGS. 4*a* through 4*f*).

The above design principle has been successfully implemented through two different approaches, as discussed below. The first embodiment, designated as a parallel float shaft free floating castor assembly 30, includes a wheel assembly 31 and a bracket assembly 32. The bracket assembly 32 is adapted to be attached to a trolley (not shown) by the bearing 15 for rotation in a horizontal plane about the castor vertical axis 12 as described above with respect to the prior art castor assembly 10. The wheel assembly 31 includes the wheel 11 rotatably mounted on the axle 13 axle in the manner described above with respect to the prior art castor assembly 10. Two pulleys 37 are fixed on the axle 13, one on each end of it. The pulleys 37 pass between a corresponding pair of parallel shafts 33 and 34, above and below the pulleys 37 respectively. The pulleys 37 have a peripheral groove for engaging either of the parallel shafts, 33 or 34. The gap between the upper and lower parallel shafts, 33 and 34, is more than the inner diameter and less than the outer diameter of the pulley 37. Therefore, the pulleys 37 can roll freely between the two shafts 33 and 34, and yet remain secure in between them. Generally and normally, the pulleys 37 remain engaged only with the upper parallel shaft pair 33 and free to roll on it. The pulleys 37, are free to roll between two limits or stops, 35 and 36, which are attached to the adjacent ends of the two pairs of parallel shafts, 33 and 34. The lower pair of the parallel shafts 34 is meant to retain the wheel assembly 31 from falling off, whenever the castor assembly 30 is lifted off of the ground. During such conditions, the pulleys 37 will get engaged with the lower shafts 34 and can roll on them, as in the other case discussed above.

Figure 7:
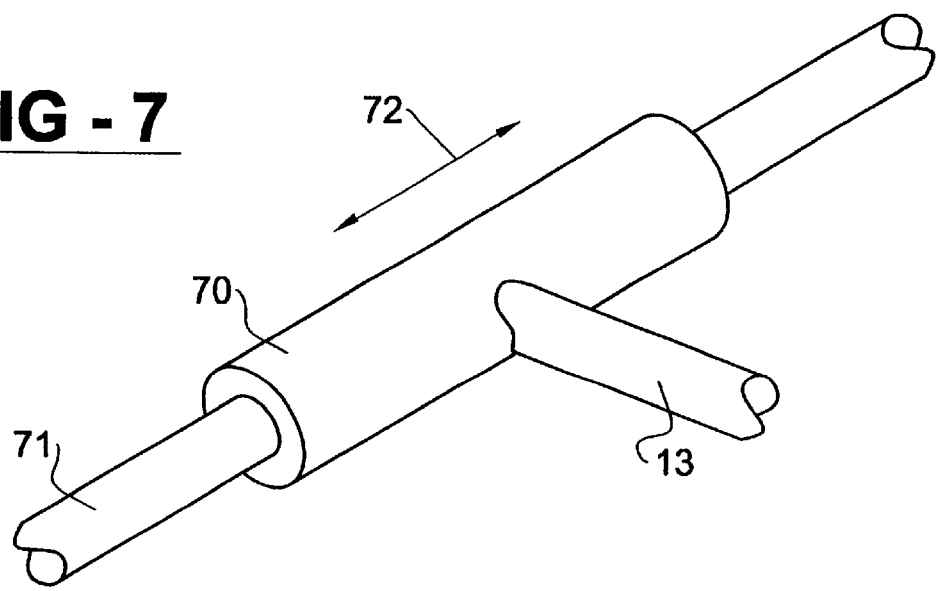
FIG. 7 is a fragmentary perspective view of a third embodiment of the castor assembly according to the present invention.

As shown in the FIG. 7, instead of adopting the pulley and parallel shaft approach above, linear bearings or sliding bushes 70 can be attached on either ends of the axle 13, instead of the pulleys 37. These bearings/bushes 70 slide on only one pair of matching cylindrical, parallel shafts 71 (only one end is shown), instead of two required in the previous case. These shafts 71 are attached to the bracket assembly 32 in the manner similar to the shafts 33 and 34 on opposite sides of the wheel 11, and the bearings/bushes 70 are free to slide along the shafts 71 as shown by an arrow 72. However, the sliding bearings/bushes 70 generally are more susceptible to dust and dirt accumulation than the pulleys 37.

The parallel shafts 33 and 34 extend equally on either side of the center of the castor vertical revolving axis 12 of the free floating castors assembly 30, with the vertical axis being perpendicular to the longitudinal axes of the parallel shafts. The pairs of parallel shafts 33 and 34 are attached to the bearing separately on either side of the wheel 11 through legs 38 extending from the ends of the upper shaft 33 at an inward angle to a generally horizontally extending plate 39. The plate 39 is attached to a generally vertically extending shaft 40 that is rotatably retained in the bearing 15 attached to the trolley to enable smooth rotation of the vertical shaft. In the alternative, each pair of the legs 38 on opposite sides of the wheel 11 can be replaced by a single leg extended downwardly from the shaft 40 and attached directly to the upper shafts 33 at the midpoints thereof.

During motion of the trolley, there will be a certain degree of friction, due to the wheel 11 rolling on the ground and that of the wheel bearings. The cumulative affect of these forces acts on the wheel 11, in the direction opposite to that of the motion. This force will push and hold the wheels 11 against one of the stops 35 and 36 depending upon the direction of travel. For example, in the FIGS. 4*a* and 4*b*, the trolley is being moved toward the right so that the wheel assembly 31 is forced to the left wherein the pulleys 37 engage the left stops 35. In this position, the wheel 11 will be a stable trail position, similar to that of the standard castor.

In the previous discussion of "wedging" of the standard prior art castors, it was explained that as the trolley moves forward, the wheels tend to move inwards or outwards towards the castor vertical axis 12. But, since the distance 16 is fixed, the wheel will get wedged between the castor vertical axis 12 and the ground contact point 19. As such, it will only be possible for the wheels to move against friction; which will be a function of the weight on the respective wheel and its coefficient of friction.

It can readily be seen that none of the constraints identified above remain applicable in the case of the free floating castor 30. In that, first, there is a "freedom of motion/space" available. The wheels 11 can move along the longitudinal "Y" axis on the parallel shafts 33. As the trolley moves forward, the wheels 11 will start "lagging", with respect to the castor vertical axis 12 as shown in the FIGS. 4*c* and 4*d*. The parallel shafts 33 and 34 and the trolley will move, until the pulleys 37 attached to the wheels 11 hit the stops 36 at the opposite ends of the parallel shafts as shown in the FIGS. 4*e* and 4*f*. Second, even if the wheels 11 tend to revolve in the opposite directions, the wedging forces being generated will push them in the direction of the resultant force vector, i.e. opposite to the direction of motion. Once again, the wheels 11 will tend to remain stationary, with respect to the ground, until the stops are reached and then assume their trailing stable position. Third, there will be no extra effort required to counter the "friction", since the distance 16 is not fixed, but is variable.

Likewise, there will be no "fishtailing" or revolving in the wrong direction problem. The trolley will smoothly reverse direction, with minimal swing, if at all. We can see that, as the trolley tends to swing, there will be certain inertia generated, due to the mass/weight of the trolley (circular acceleration) which will act on the wheels 11, in equal and opposite direction. Since there will be no resistance to counter this force, except for the friction of the bearing of the pulleys 37 on the parallel shafts 33 and 34, the swing will be minimized.

Figure 5:
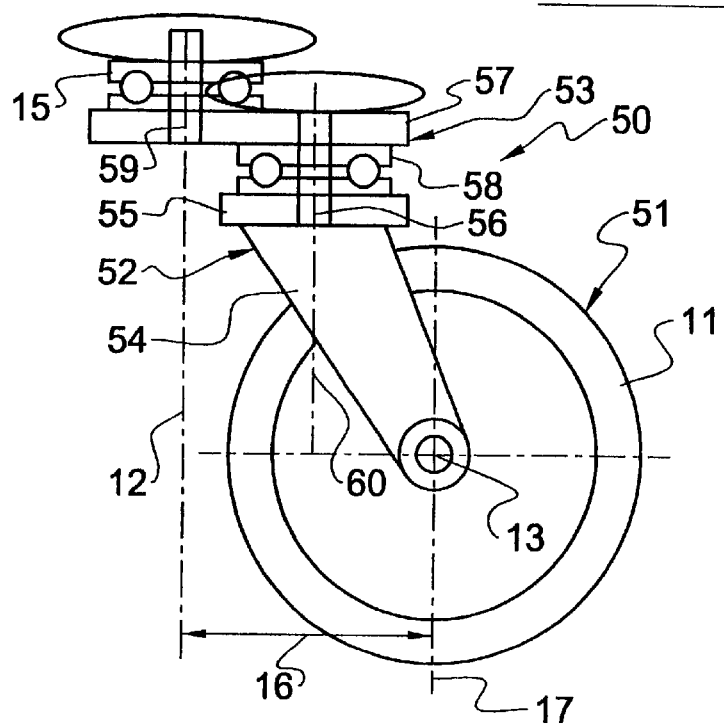
FIG. 5 is a schematic elevation view of the free floating castor in accordance with a second embodiment of the present invention.

A second embodiment of the free floating castor is shown in the FIG. 5. A double rotary joint free floating castor assembly 50, includes a wheel assembly 51, a bracket assembly 52 and a joint assembly 53. The wheel assembly 51 includes the standard wheel 11 and axle 13. The wheel assembly 51 is attached to a lower end of the bracket assembly 52. The bracket assembly 52 includes a bracket 54 similar to the standard bracket 14 but having an upper end terminated in a generally horizontally extending first plate 55 spaced both vertically and horizontally from the bearing 15 adapted to be attached to a trolley (not shown). Extending upwardly from the plate 55 is a first shaft 56. The joint assembly 53 includes a generally horizontally extending second plate 57 positioned above the first plate 55 and having a joint bearing 58 attached to an underside thereof for rotatably retaining the first shaft 56. Extending upwardly from the second plate 57 is a second shaft 59 that is rotatably retained by the bearing 15.

The second shaft is aligned with the castor vertical axis 12 that is spaced the distance 16 from the wheel vertical axis 17.

Figure 6A:
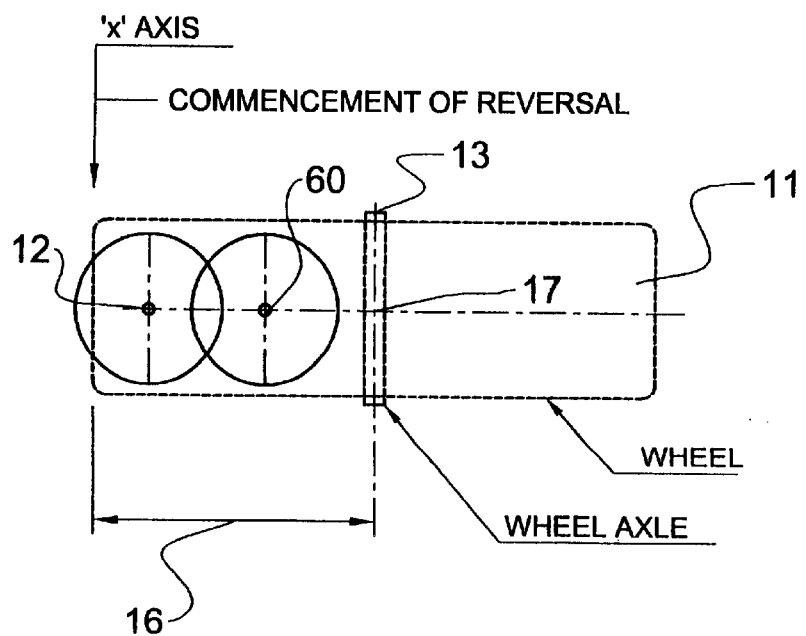
FIGS. 6a through 6e are schematic plan views of the free floating castor shown in the FIG.5.
Figure 6B:
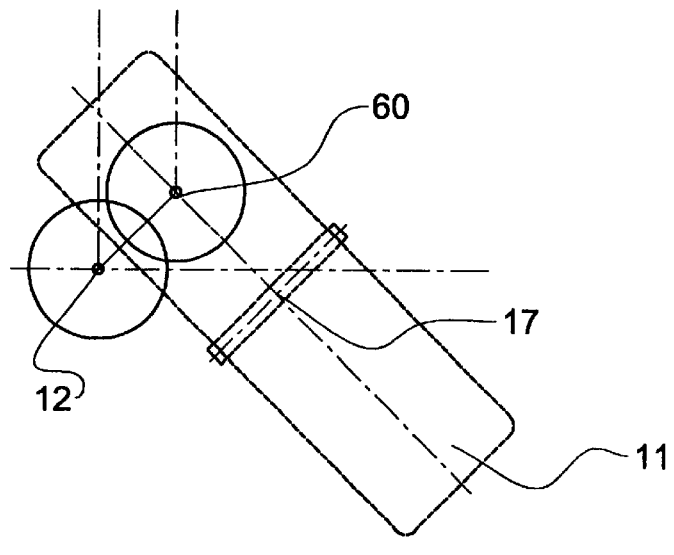
Figure 6C:
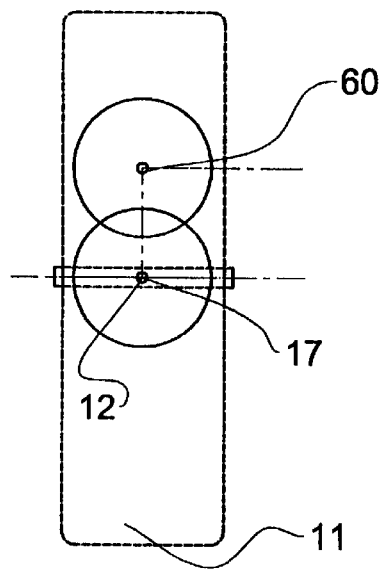
Figure 6D:
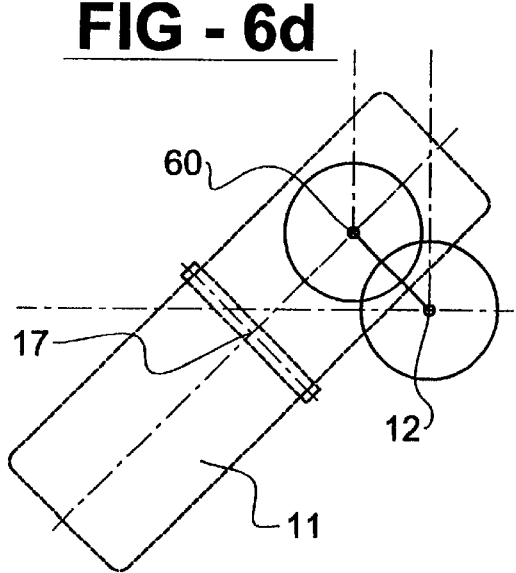
Figure 6E:
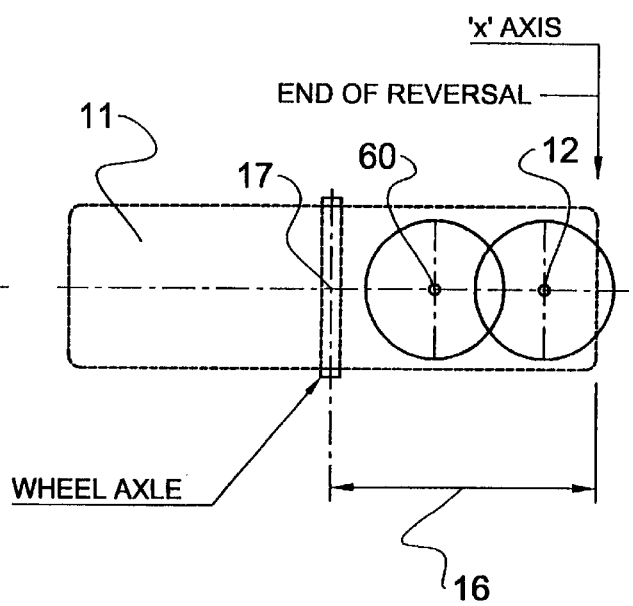

The first shaft 56 is shown as being ideally positioned midway between the vertical axes 12 and 17 at a joint vertical axis 60. Now, the wheel vertical axis 17 can revolve around the joint vertical axis 60 which, in turn, can revolve around the castor vertical axis 12. During motion of the castor assembly 50 in a straight line, the axes 12, 60 and 17 will lie in a straight line over the distance 16 (see the FIGS. 6a and 6e). Since the wheel axis 17 has freedom to revolve around the joint axis 60, in a circle of diameter equal to the distance 16, the wheel 11 can assume any position within the circle (see the FIGS. 6b and 6e) having the radius equal to the distance 16 and even can be superimposed on the castor vertical axis 12 as shown in the FIG. 6c. Thus, the constraints of the standard prior art castor can be overcome through this approach as well. Similar to the case of the parallel float shaft assembly 30, the wheels 11 remain stable in trail position during constant motion.

While reversing, the wheels 11 will deviate, being in an unstable state. The point of contact will again act as the pivot point. Wedging/frictional forces will tend to compress the "trail arm" bracket 54. As the trolley moves forward, each wheel 11 will also tend to rotate over its ground contact point. Consequently, certain torque will develop at the point 19, due to friction of rotation, which will resist the rotation. These forces will cumulatively act on the bracket assembly 52 and the joint assembly 53 folding at the junction defined by the joint vertical axis 60 (see the FIG. 6b). As the trolley moves further, the trail arm will progressively contract, until it crosses the castor vertical axis 12 (see the FIG. 6c), and then extend fully to the trail position (see the FIG. 6e).

No special process, technology, etc., is needed to fabricate or produce the free floating castors. The entire assembly can be fabricated according to any design specifications. There is no limit either to its size or weight carrying capacity. Similarly, any suitable material/available components, such as the shafts, wheels, bearings, etc., could be used for manufacturing the various items of the assembly. The only added cost to that of the standard castors, will be that of the parallel shafts in the first embodiment or the rotary joint in the second embodiment, an additional bearing for each assembly, and the additional machining and fabrication charges thereof.

There are certain specific requirements that need be met in case of the free floating castor according to the present invention. First, the verticality of the vertical axis 12 must be maintained. In other words, there should be no play in the bearing 15, along with the bearing friction being minimal. Second, the parallel shaft or shafts 33 should always remain perpendicular to the vertical axis 12. Third, the rolling friction of the pulleys 37—while rolling on shaft 33 and turning—should be minimized. Fourth, it is also necessary to maintain the direction of the pulleys 37 along the shafts 33. Fifth, preventing the wheel assembly from falling off when the trolley is lifted off the ground. Sixth and last, but not the least, minimizing the cost and the degree of difficulty in designing and manufacturing. These above-mentioned requirements, per se, do not directly pertain to the invention in question, but are generic engineering design problems. There could be several ways in which these and other design requirements could be met, depending upon the specification of the design. Nevertheless, some of the ways in which the said requirements could be met, are discussed herein below. Alternatives, if any, could be permutations and combination of the points mentioned above.

Figure 8A:
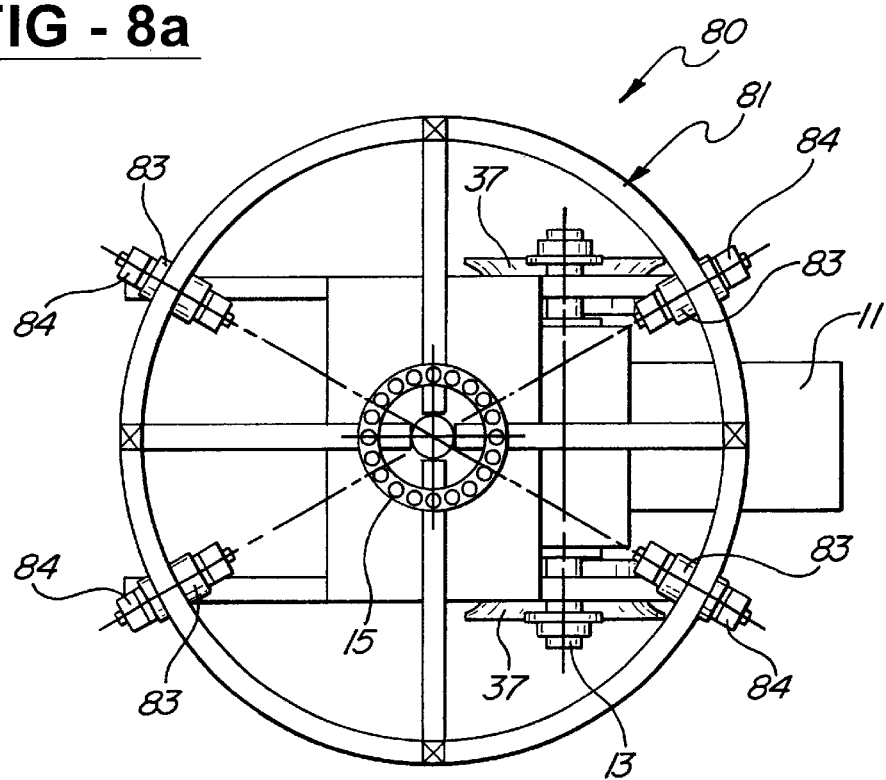
FIGS. 8a and 8b are a top plan view and an elevation view respectively of a fourth embodiment of the castor assembly according to the present invention.
Figure 8B:
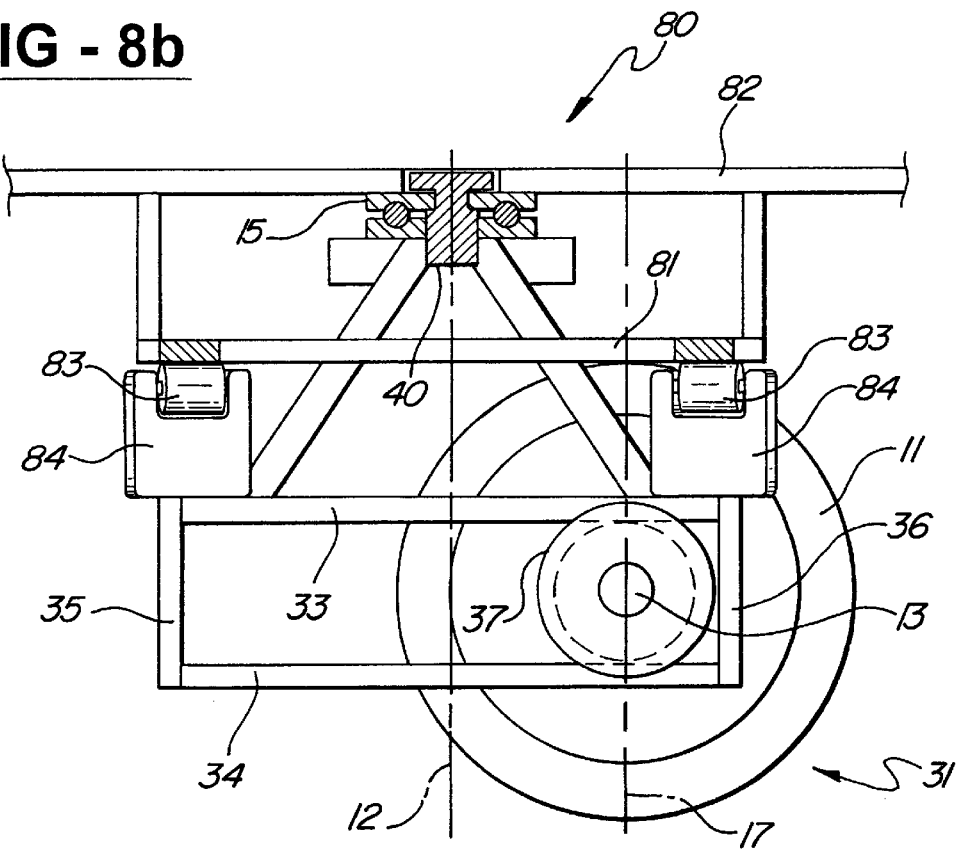

It can be appreciated that the stress on the bearing 15 will be due to angular (cantilever) loads. Suitable bearings can be chosen for the specific purpose. However, in case of heavier load factors, the bearing specifications and the strength of the vertically extending shaft 40 (also, shafts 56 and 59) will be very stringent. A solution to this problem is provided by an alternate embodiment castor assembly 80, shown in the FIGS. 8a and 8b, having all of the components of the castor assembly 30 described above. Instead of using conventional methods to increase the load bearing capacity of the components, it is preferable to provide a circular, ring-shaped load-bearing rail 81, rigidly attached to the body of a trolley 82 as shown in the FIG. 8. The diameter of the rail 81 is nearly, and ideally, equal to length of the shaft 33 and the rail is concentric with the vertical shaft 40. The rail 81 extends in a plane perpendicular to the vertical axis 12. On either ends of the upper shafts 33, two rollers 83 each are rotatably fitted at the upper ends of posts 84 extending upwardly from the shaft, one each, near or on either end of each shaft. The horizontal or rotational axis of the respective roller 83 is tangential to the circular rail 81. The circular load-bearing rail 81 extends downward from the trolley 82, such that the four rollers 83 are in contact with the rail. When the wheel assembly 31 swivels/revolves around the vertical axis 12, the rollers 83 roll on the downwardly facing surface of the rail 81. The cantilever load on the shaft 33 is thus transferred onto the rail 81, thereby off-loading the stress on the bearing 15, the shaft 40 and the entire assembly above the shaft 33. In this arrangement, the requirement of maintaining the verticality and avoidance of "play" in the vertical has been achieved. The parallel shaft 33 will also remain perpendicular to the vertical axis 12. It may also be noted that, more than one circular rail assembly and/or additional rollers could be fitted, subject to the design specifications. Also, the rail 81 can be attached to the shafts 33 and the rollers 83 and the posts 84 can be attached to the trolley 82.

Figure 9A:
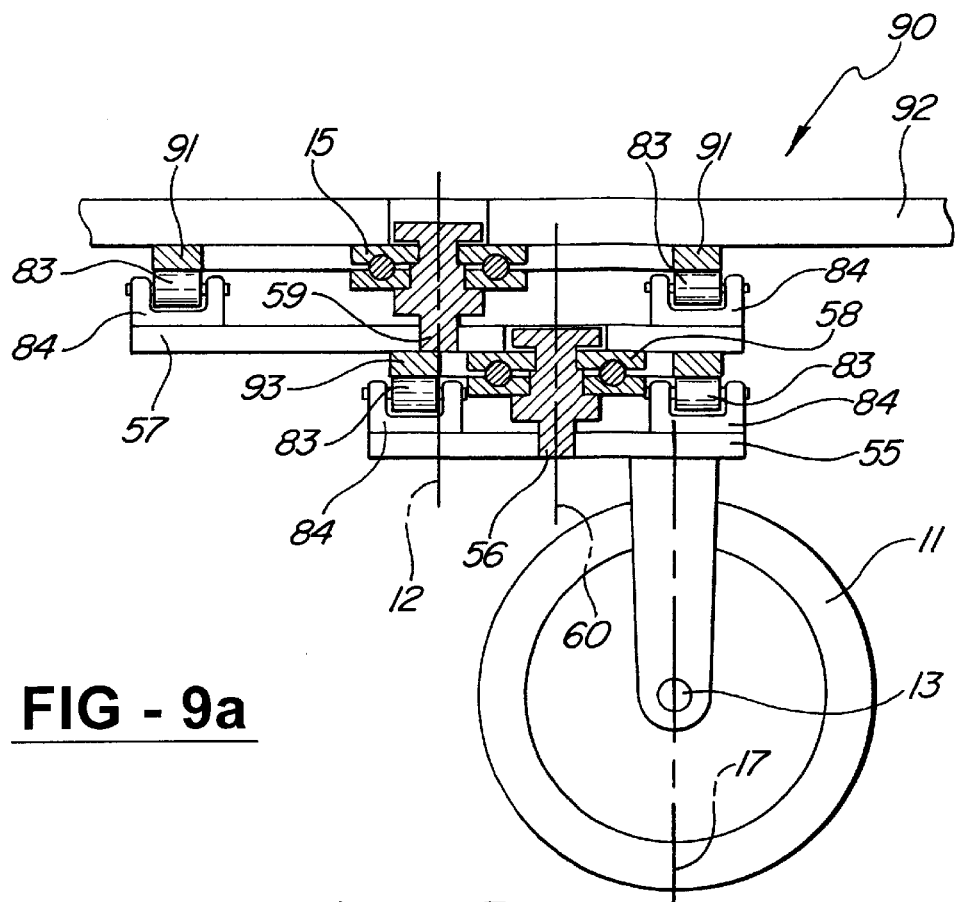
FIGS. 9a and 9b are an elevation view and a top plan view respectively of a fifth embodiment of the castor assembly according to the present invention.
Figure 9B:
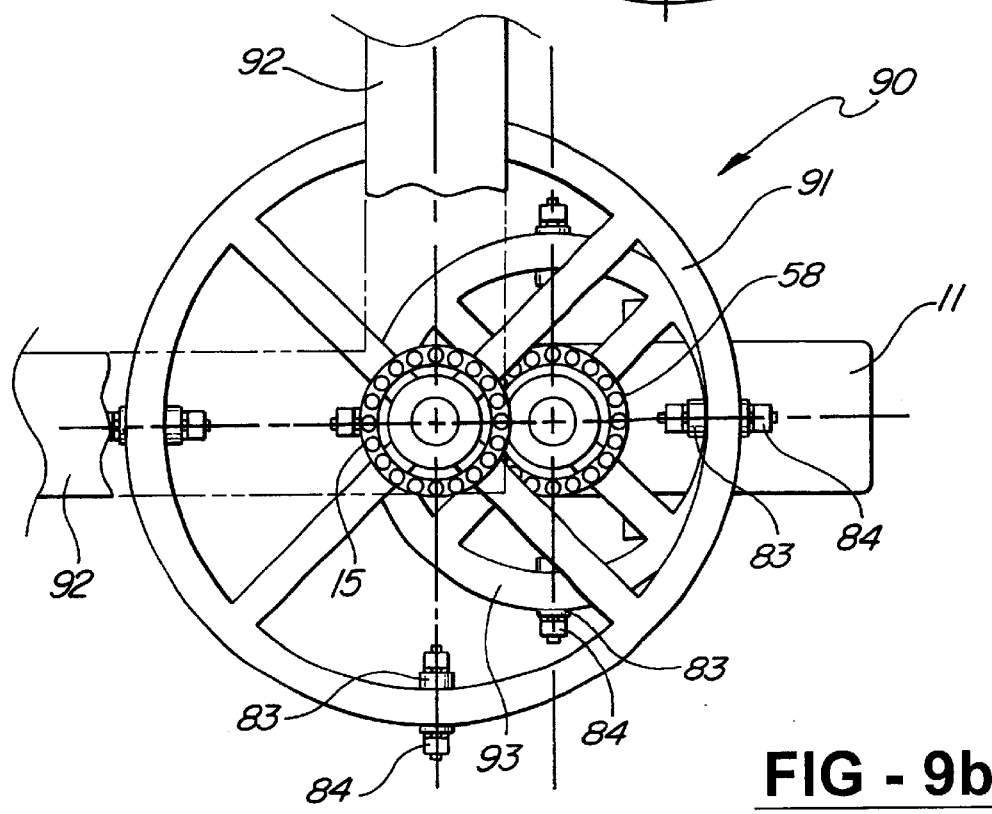

The circular rail approach can also be implemented in any type of castor assembly where the vertical axis of the wheel is offset from the castor vertical axis. For example, the rail can be used with the double rotary joint assembly shown in the FIG. 5. Two circular rails, similar to the rail 81 shown in the FIGS. 8a and 8b, of different diameters can be used. As shown in the FIGS. 9a and 9b, a castor assembly 90 has a larger diameter rail 91 attached underneath a trolley 92 engaging a plurality of the rollers 83 each mounted on one of the posts 84 extending upwardly from the horizontally extending second plate 57. The rail 91 is concentric with the vertical axis 12. A second, smaller diameter rail 93 is attached underneath the plate 57 engaging a plurality of the rollers 83 each mounted on one of the posts 84 extending upwardly from the horizontally extending first plate 55. The ring 93 is concentric with the vertical axis 60. The diameter of the rail 91 will be nearly equal to the length of the horizontally extending plate 57 and the diameter of the rail 93 will be nearly equal to the length of the horizontally extending plate 55.

Like in the case of the previously described free floating castor assembly 80, the angular/cantilever loads acting on the two horizontally extending plates 57 and 55 are transferred onto the body of the trolley, through the respective circular rails, without affecting the bearings 15 and 58. Whenever the axis 12, 17 and 60 are not aligned, there will be a certain torque generated, due to misalignment of axes (see the FIGS. 6b and 6d). The two supporting arms described above are provided to support such torque acting on the bearing 15 through the plate 57.

In case of the parallel shaft approach, the rolling friction between the pulley 37 and shaft 33 is caused due to the rims of the pulley coming in contact with the shaft, particularly during turning. While turning, the wheel 11 will tend to oppose the rotation, due to friction with the ground. This friction will get transferred in form of torque onto the shaft 33 through the axle 13 and the pulley 37. The shaft 33 will rub against the wall of the peripheral groove of the pulley 37 and the torque applied at these points will be the very high—product of the moment arm of the shaft 33 and the friction force generated due to turning, as discussed above. This will cause some resistance to free rolling of the pulley 37 on the shaft 33.

Figure 10A:
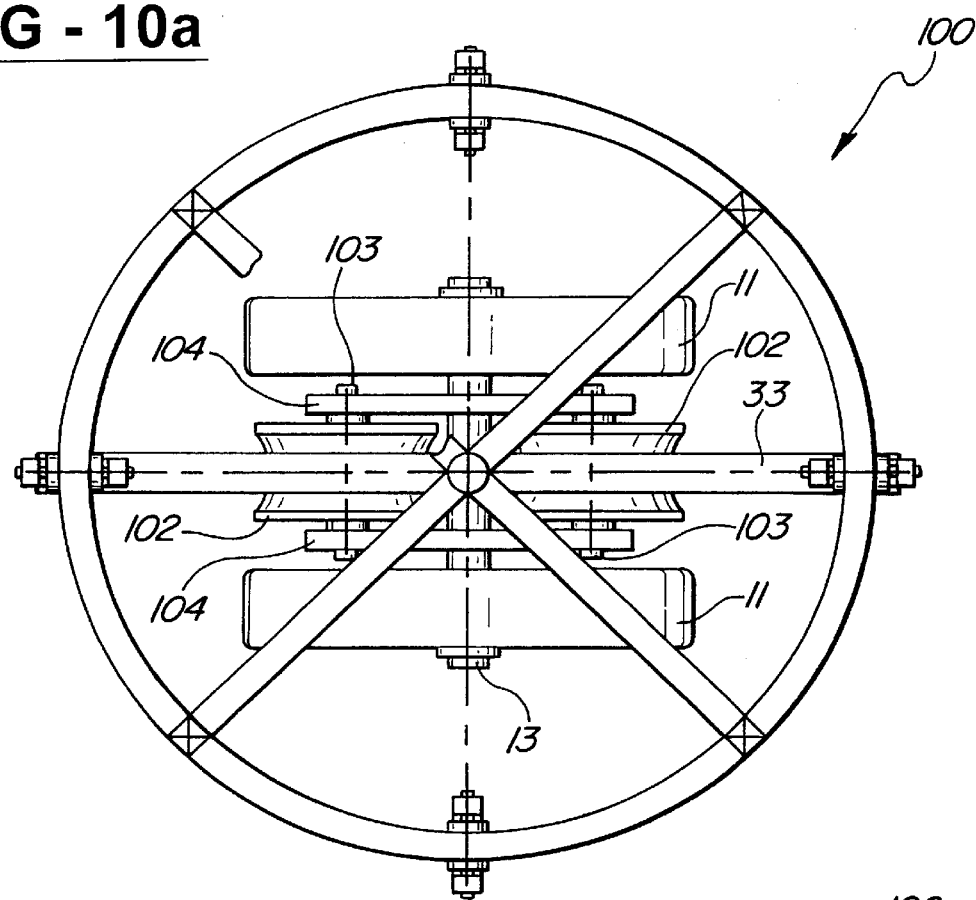
FIGS. 10a through 10c are a top plan view, elevation view and schematic cross-sectional view of a sixth embodiment of the castor assembly according to the present invention.
Figure 10B:
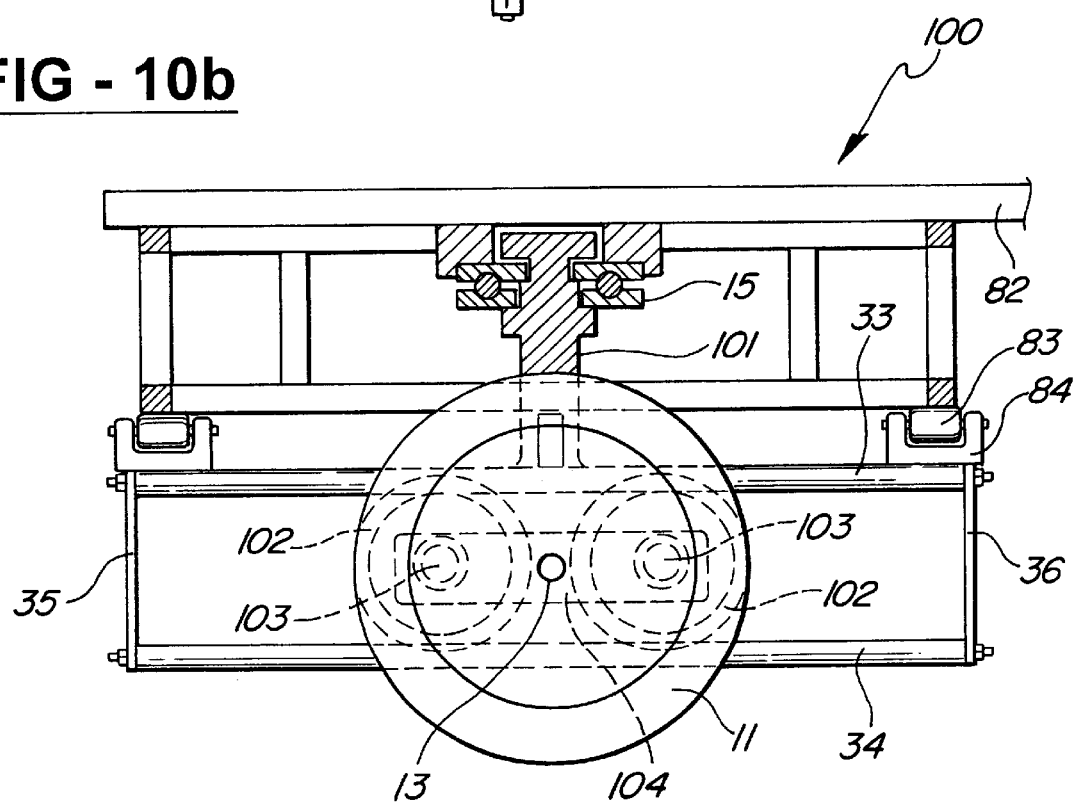
Figure 10C:
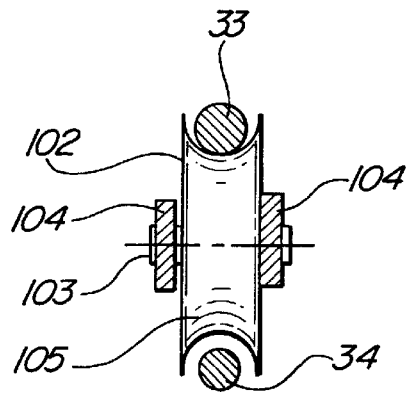

This factor could be minimized through adoption of several approaches. First, in order to minimize this friction, a pair of pulleys can be used in place of the single pulley 37 described above. As shown in the FIGS. 10a through 10c, an alternate embodiment castor assembly 100 is attached to the trolley 82 by the bearing 15 and an elongated vertical shaft 101 attached to the upper shaft 33 at a midpoint thereof. A pair of pulleys 102 mounted on associated axles 103 are placed in tandem and are spaced a certain distance apart with the wheel shaft 13 passing between them. In order to house the pulleys 102 and attach the axle 13, two connecting plates 104, one on either side of the pulleys, are provided. The wheel axle 13 is rigidly attached to the plates 104 and the pulleys 102 are mounted to the plates by the respective axles 103. As this arrangement increases the distance of the points of contact of the rims of the respective pulleys with the shaft 33, moving them away from the center, as discussed above, the friction is consequentially minimized. In this case, it would be preferable to keep the outer circumferences of the two pulleys within the diameter of the wheel 11 as shown. This arrangement is more suitable when heavier loads/larger wheel diameters are involved. As shown in the FIG. 10c, the lower shaft 34 can have a smaller diameter than the upper shaft 33 to prevent contact with the wall of a groove 105 formed in the periphery of the roller 102 since the lower shaft 34 simply prevent loss of the wheel 11 when the trolley 82 is lifted.

The castor assembly 100 also illustrates the use of two of the wheels 11 mounted on the axle 13 on either side of a single upper shaft 33 and a single lower shaft 34. Such a configuration also can be used with the castor assembly 30 and the castor assembly 80.

Figure 11:
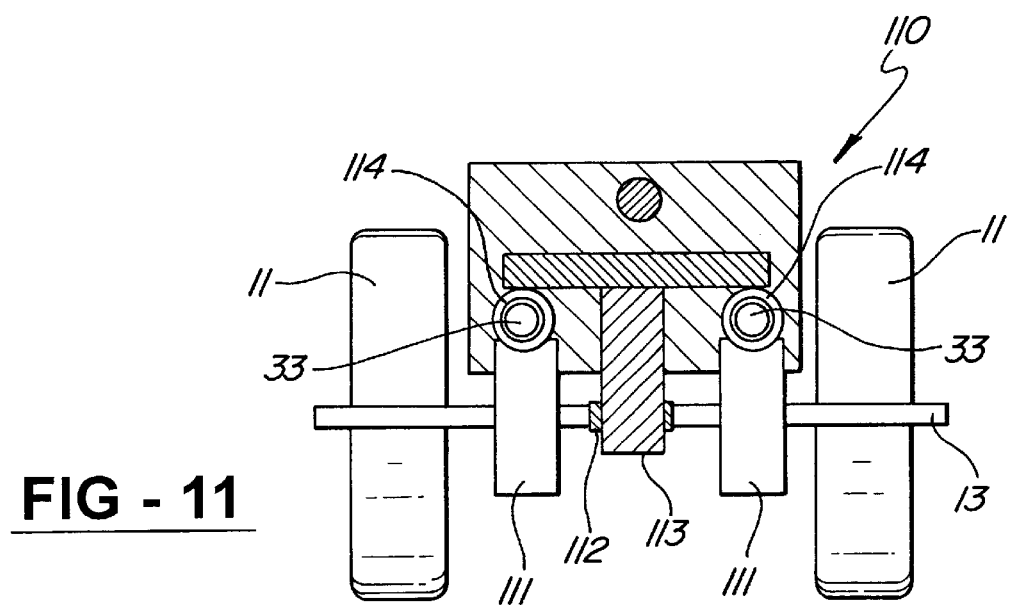
FIG. 11 is an elevation view of a seventh alternate embodiment of the castor assembly according to the present invention.

Second, instead of using the grooved pulleys 37 and 102, rollers 111 without grooves are mounted on the axle 13 to engage a pair of the upper shafts 33 as shown in the FIG. 11 forming an alternate embodiment castor assembly 110. This arrangement will essentially entail use of some mechanism to maintain/guide the rollers 111 on the shafts 33. This is achieved in several ways. First, in between the two rollers 111 on the axle 13, another bush/bearing 112 is rotatably fitted. This bush/bearing is rigidly fitted near the lower end of a generally "T" shaped housing 113, which extends up to the level of the shafts 33, with the top handle of the generally "T" shaped housing being parallel to, and in between, the shafts. At the either ends of the top section of the "T" shaped housing 113, two sliding bushes/linear bearings 114 each are attached, such that the bushes/linear bearings freely slide on the shafts 33 as in the structure shown in the FIG. 7. It is to be noted that, in this case, the load is not transferred on the bushes 114, but acts only on the rollers 111. This could be achieved by providing sufficient clearance between the inner diameter of the bushes 114 and the shafts 33. In this case, the lower shaft 34 is not required.

In the case discussed above, there will be a susceptibility to dust accumulating and hindering smooth movement of the bushes 114 on the shafts 33. Therefore, instead of bushes/linear bearings 114, either rollers or pulleys are used. In order to guide and/or maintain the rollers or pulleys along the shafts 33, additional rollers are rotatably attached, generally one each, at the either ends of the top handle of the generally "T" shaped housing/bracket 113, with the axis of rotation of the rollers being vertical and perpendicular to the shafts 33. The rollers could either be placed in between the shafts 33 or outside. In order to prevent the wheel assembly from falling off when the trolley is lifted off the ground, similar rollers are rotatably attached on top of shafts 33, in proximity of the vertically rotating rollers or pulleys with the axis of rotation of the rollers being horizontal and perpendicular to the shafts 33. The rollers are so placed that there remains a minimum clearance between the circumference of the rollers and the shafts 33. The rollers also keep the "T" shaped housing/bracket oriented in the vertical position. In the case above, there will be a total of eight rollers per wheel assembly.

This number of rollers could be reduced to four, if the either type of rollers is mounted with the axis of rotation being generally 45°, instead of "vertical" or "horizontal" as discussed above. Since this arrangement will have equal component of the vertical and horizontal vectors, the rollers can perform both functions. Instead of the rollers discussed above, pulleys could be used. In this case, it would suffice to install the pulleys in place of the vertical rollers, such that the rims (major/outer diameter) of the pulleys ride over the shafts 33 and a minimum clearance being maintained between the inner/minor diameter of the pulleys and the shafts. In this case, the requirement of the horizontal rollers will become superfluous, as the grooves/rims of the pulleys will engage the shaft 33 whenever the trolley is lifted off the ground, thus preventing disengagement of the wheel assembly. Similarly, the pulleys will also retain the "T" shaped housing/bracket oriented in the vertical position. Generally four pulleys, per wheel assembly, will also be required in this case (even three would suffice, if two are rolling on one shaft and one on the other, and in-between, the two).

Figure 12:
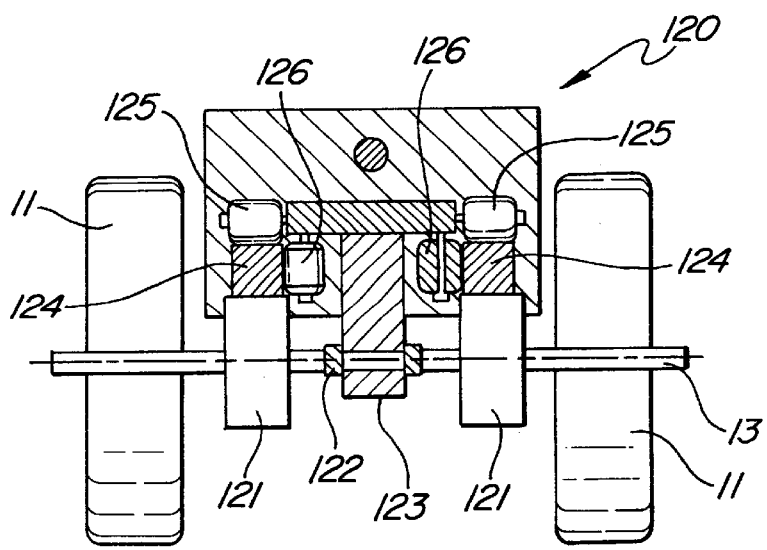
FIG. 12 is an elevation view of an eighth embodiment of the castor assembly according to the present invention.

In the FIG. 12, rollers 121 without grooves are mounted on the axle 13 to engage a pair of upper shafts 124 forming an alternate embodiment castor assembly 120. The shafts 124 have a square cross section. In between the two rollers 121 on the axle 13, a bush/bearing 122 is rotatably fitted. This bush/bearing 122 is rigidly fitted near the lower end of a generally "T" shaped housing 123, which extends up to the level of the shafts 124, with the top handle of the generally "T" shaped housing being parallel to, and in between, the shafts. At either ends of the top section of the "T" shaped housing 123, two rollers 125 are attached to run on the upper surfaces of the shafts 124. Additional rollers 126 extend downwardly from the housing 123 to run on side surfaces of the shafts 124.

Figure 13:
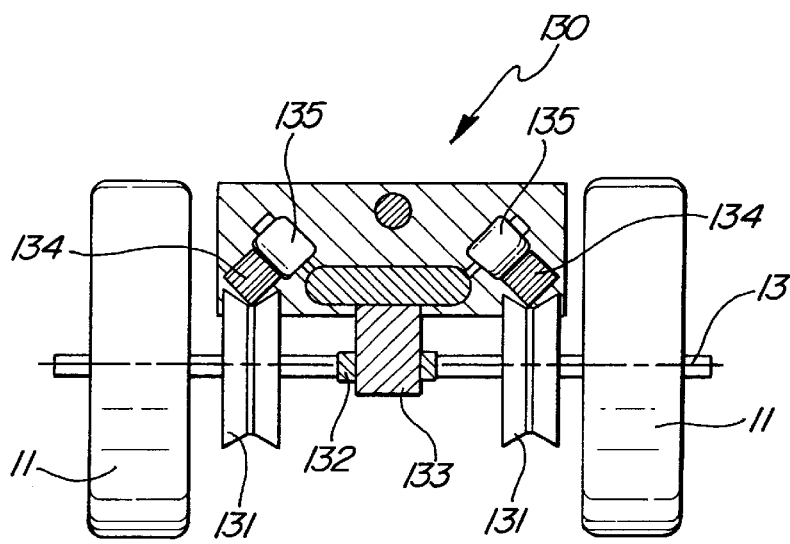
FIG. 13 is an elevation view of a ninth embodiment of the castor assembly according to the present invention.

In the FIG. 13, pulleys 131 with grooves are mounted on the axle 13 to engage a pair of upper shafts 134 forming an alternate embodiment castor assembly 130. The shafts 134 are square in cross section with the flat surfaces extending at 45° to the horizontal and vertical. In between the two pulleys 131 on the axle 13, a bush/bearing 132 is rotatably fitted. This bush/bearing 132 is rigidly fitted near the lower end of a generally "T" shaped housing 133, which extends up to the level of the shafts 134, with the top handle of the generally "T" shaped housing being parallel to, and in between, the shafts. At either ends of the top section of the "T" shaped housing 133, two rollers 135 are attached at angles to run on the facing surfaces of the shafts 134.

Figure 14:
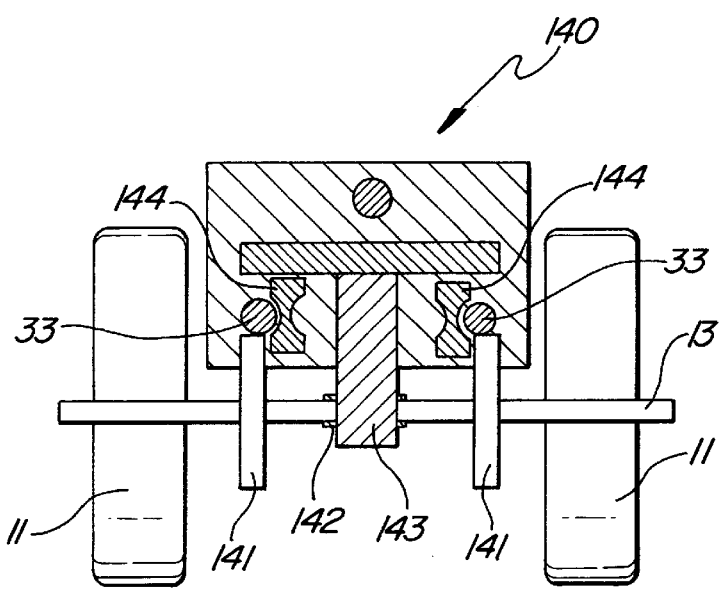
FIG. 14 is an elevation view of a tenth embodiment of the castor assembly according to the present invention.

In the FIG. 14, rollers 141 with grooves are mounted on the axle 13 to engage a pair of upper shafts 33 forming an alternate embodiment castor assembly 140. In between the two rollers 141 on the axle 13, a bush/bearing 142 is rotatably fitted. This bush/bearing 142 is rigidly fitted near the lower end of a generally "T" shaped housing 143, which extends up to the level of the shafts 33, with the top handle of the generally "T" shaped housing being parallel to, and in between, the shafts. At either ends of the top section of the "T" shaped housing 143, two rollers 144 extend downwardly and are grooved to run on the shafts 33.

Although the shafts 33 and 124 each have been shown with a circular and a square cross-section respectively, other shapes may be desirable, such as triangular, rectangular, oval, etc.

Figure 15:
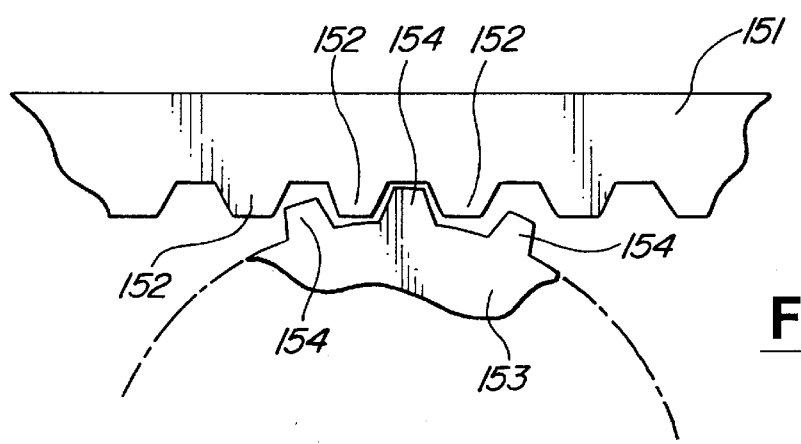
FIG. 15 is a fragmentary elevation view of an eleventh embodiment of the castor assembly according to the present invention.

There is shown in the FIG. 15 another alternate embodiment of the castor assembly according to the present invention. In this case, a shaft 151 has a plurality of teeth 152 formed on a downwardly facing surface to function as a "rack". A pinion 153 has a plurality of complementary teeth 154 formed on a periphery thereof for engaging the teeth 152 on the shaft 151. Movement of the pinion 153 along the shaft/rack 151 causes the pinion 153 to rotate. The shaft/rack 151 can replace any of the shafts shown in the above-described embodiments while the pinion 153 replaces the associated pulley, linear bearing/bushing or roller.

Although a number of specific embodiments have been shown, individual features from one embodiment can be incorporated into another one of the embodiments without changing the objects of the invention.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A castor apparatus for attachment to a trolley comprising:
   a bearing for attachment to a trolley and having a generally vertically extending castor vertical axis;
   a bracket assembly retained by said bearing and rotatable about said castor vertical axis, said bracket assembly including at least one generally horizontally extending shaft having a stop at either end thereof;
   at least one wheel rotatably mounted on an axle for engaging and rolling along a surface; and
   a mounting means attached to said axle and engaging said shaft for permitting free movement of said wheel and said axle in a generally horizontal plane along said shaft between both said stops transverse to said castor vertical axis within a predetermined area surrounding said castor vertical axis, said mounting means including at least one pulley attached to said axle and having a peripheral groove engaging said shaft, whereby when said bearing is attached to a trolley, said wheel and said axle trail said castor vertical axis along a path of travel of the trolley and said wheel is prevented from wedging and/or fishtailing upon reversal of a direction of the trolley along the path of travel.

2. The castor apparatus according to claim 1 wherein said bracket assembly includes another generally horizontally extending shaft, both shafts being positioned on opposite sides of said wheel, said mounting means engaging each of said shafts for permitting the free movement of said wheel.

3. The castor apparatus according to claim 1 including another wheel rotatably mounted on said axle for engaging and rolling along a ground surface; said shaft being positioned between both wheels.

4. The castor apparatus according to claim 1 wherein said mounting means includes at least one roller attached to said axle and engaging said shaft.

5. The castor apparatus according to claim 1 wherein said shaft is an upper shaft and including a lower shaft extending generally parallel to and below said upper shaft between both stops, said mounting means engaging said upper shaft when said wheel is resting on a surface and engaging said lower shaft only when said wheel is lifted away from the surface.

6. The castor apparatus according to claim 1 including another wheel rotatably mounted on an axle for engaging and rolling along a ground surface; another shaft extending generally parallel to said at least one shaft, generally horizontal extending both shafts being positioned between said wheels, and a generally "T" shaped housing attached to said axle between both wheels and both shafts, and one of a roller and a linear bushing attached to said housing and engaging both shafts to attach both wheels to said bracket assembly.

7. The castor apparatus according to claim 1 wherein said shaft is one of circular or square in cross section.

8. A castor apparatus for attachment to a trolley comprising:
   a bearing adapted to be attached to a trolley and having a generally vertically extending castor vertical axis;
   a bracket assembly retained by said bearing and rotatable about said castor vertical axis, said bracket assembly including at least one generally horizontally extending shaft;
   at least one wheel assembly rotatably mounted on an axle for engaging and rolling along a ground surface;
   a mounting means attached to said axle and engaging said shaft for permitting free movement of said wheel transverse to said castor vertical axis within a predetermined area surrounding said castor vertical axis whereby when said bearing is attached to a trolley, said wheel trails said castor vertical long a path of travel of the trolley and said wheel is prevented from wedging and/or fishtailing upon reversal of a direction of the trolley along the path of travel along of travel; and
   another wheel rotatably mounted on an axle for engaging and rolling along a ground surface, another shaft extending generally parallel to said one shaft, both shafts being positioned between both wheels, and a generally "T" shaped housing attached to said axle to said housing and engaging both shafts to attach both wheels to said bracket assembly.

9. The castor apparatus according to claim 8 wherein said bracket assembly includes another generally horizontally extending shaft, said shafts being positioned on opposite sides of said wheel, said mounting means engaging each of said shafts for permitting the free movement of said wheel.

10. The castor apparatus according to claim 8 wherein each said mounting means includes at least one of a pulley, a roller or a pinion engaging said shaft.

11. The castor apparatus according to claim 8 wherein said bracket assembly includes means coupling said wheel and axle to said bracket assembly.

12. A castor apparatus for attachments to a trolley comprising:

a bearing for attachment to a trolley and having a generally vertical extending castor vertical axis;

a bracket assembly retained by said bearing and rotatable about said castor vertical axis, said bracket assembly including a generally horizontally extending upper shaft having a stop at either thereof and a lower shaft extending generally parallel to and below said upper shaft;

at least one wheel rotatably mounted on an axle for engaging and rolling along a surface; and a mounting means attached to said axle and engaging said shafts for permitting free movement of said wheel and said axle generally horizontal plane along said upper shaft between both stops transverse to said castor vertical axis within a predetermined area surrounding said castor vertical axis whereby when said bearing is attached to a trolley, said wheel and said axle trail said castor vertical axis along a path of travel of the trolley and said wheel is prevented from wedging and/or fishtailing upon reversal of a direction of the trolley along the path of travel.

* * * * *